(12) United States Patent
Lim et al.

(10) Patent No.: US 8,265,486 B2
(45) Date of Patent: Sep. 11, 2012

(54) OPTICAL COMMUNICATION MODULE

(75) Inventors: Kwon-Seob Lim, Gwangju-si (KR); Hyun Seo Kang, Gwangju-si (KR); Jai Sang Koh, Gwangju-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 275 days.

(21) Appl. No.: 12/617,136

(22) Filed: Nov. 12, 2009

(65) Prior Publication Data
US 2011/0044696 A1 Feb. 24, 2011

(30) Foreign Application Priority Data
Aug. 24, 2009 (KR) .................. 10-2009-0078261

(51) Int. Cl.
*H04B 10/00* (2006.01)
(52) U.S. Cl. ........ 398/135; 398/138; 398/139; 398/164; 398/136; 398/137; 385/89; 385/90; 385/92; 385/93
(58) Field of Classification Search .................. 398/135, 398/136, 137, 138, 139, 128, 164, 82, 79, 398/84, 85, 86, 87, 158, 159, 160, 163, 192, 398/193, 194, 195, 196, 197, 198, 202, 208, 398/209, 130, 129, 131; 385/88, 89, 90, 385/92, 93, 14
See application file for complete search history.

(56) References Cited

U.S. PATENT DOCUMENTS

| | | | |
|---|---|---|---|
| 5,854,867 A | 12/1998 | Lee et al. | |
| 7,013,056 B2 | 3/2006 | Lin et al. | |
| 7,040,816 B2 | 5/2006 | Fujita et al. | |
| 7,290,942 B2 | 11/2007 | Kuhara et al. | |
| 8,005,367 B2 * | 8/2011 | Nakanishi et al. | 398/138 |
| 2004/0146304 A1 * | 7/2004 | Kuhara et al. | 398/138 |
| 2006/0110094 A1 | 5/2006 | Bachl et al. | |
| 2006/0115207 A1 | 6/2006 | Uekawa et al. | |
| 2007/0146881 A1 * | 6/2007 | Tanaka et al. | 359/487 |

FOREIGN PATENT DOCUMENTS
JP 2004-226845 8/2004
JP 2005-257911 9/2005
* cited by examiner

*Primary Examiner* — Hanh Phan
(74) *Attorney, Agent, or Firm* — Staas & Halsey LLP

(57) ABSTRACT

An optical communication module which uses a single optical fiber to enable bidirectional communication or multiplexing communication is provided. The optical communication module includes a platform configured to have a through-hole therein which vertically passes through the platform; an optical receiver configured to be provided on the platform and include a light-receiving element; an optical transmitter configured to be provided on the platform and include a light-emitting element; and an optical filter configured to be provided on one surface of the platform to correspond to the through-hole, transmit light from the light-emitting element to an optical line, and transmit light input through the optical line to the light-receiving element, where one of the light-receiving element and the light-emitting element is provided on one surface of the platform on an opposite side of the optical line with the optical filter interposed therebetween, and the other is provided on the other surface of the platform to correspond to the through-hole. Accordingly, it is possible to reduce the manufacturing cost, minimize the optical or electrical crosstalk, and maximize the optical coupling efficiency.

19 Claims, 12 Drawing Sheets

(a)

(b)

(c)

(d)

OPTICAL COMMUNICATION MODULE

CROSS REFERENCE TO RELATED APPLICATION

This application claims the benefit under 35 U.S.C. §119(a) of Korean Patent Application No. 10-2009-0078261, filed on Aug. 24, 2009, the disclosure of which is incorporated by reference in its entirety for all purposes.

BACKGROUND

1. Field

The following description relates to an optical communication module, and more particularly, to an optical communication module which uses a single optical fiber to make bidirectional communication or multiplexing communication.

2. Description of the Related Art

A conventional bidirectional optical transceiver module is typically configured such that an optical filter is provided in a metal housing and a TO-Can type optical transmitter package and a TO-Can type optical receiver package are provided in an active alignment manner and fixed to the metal housing by a laser welder.

Since two TO-Can type packages are provided in an active alignment manner by the laser welder, the bidirectional optical transceiver module can obtain a maximum optical coupling efficiency but requires a number of process steps resulting in a low production.

For example, U.S. Pat. Nos. 7,013,056, 7,040,816, US 2006/0115207 and US 2006/0110094 disclose that a lens or an optical filter is mounted on a V-groove or a recess which is formed on a substrate, such as a silicon optical bench (SiOB). Further, an output optical signal of an optical transmitter passes through a 45-degree optical filter, and an input optical signal is reflected by an inclined surface of the optical filter and is converted in optical path by 90 degrees. The converted input optical signal is reflected by the inclined surface of the V-groove of the SiOB and is coupled to an optical receiver.

However, the conventional bidirectional optical transceiver module thus configured may experience severe optical/electrical crosstalk since the optical transmitter and the optical receiver are provided on the top surface of the same substrate. Furthermore, since the optical coupling is made using the inclined surface of V-groove of SiOB, the optical coupling efficiency may be low and the alignment tolerance may be small.

In addition, if such a bidirectional optical transceiver module as described above is applied to high-speed signal transmission, the above-mentioned crosstalk may become more significant. Further, since a photodiode chip of the optical receiver has such a small active region that the coupling efficiency between the optical receiver and the optical filter becomes lower, this type of a bidirectional optical transceiver module is not appropriate for high-speed signal transmission.

SUMMARY

The following description relates to an optical communication module which reduces the manufacturing cost, minimizes the optical or electrical crosstalk and maximizes the optical coupling efficiency.

In one general aspect, there is provided an optical communication module including: a platform configured to have a through-hole therein which vertically passes through the platform; an optical receiver configured to be provided on the platform and include a light-receiving element; an optical transmitter configured to be provided on the platform and include a light-emitting element; and an optical filter configured to be provided on one surface of the platform to correspond to the through-hole, transmit light from the light-emitting element to an optical line, and transmit light input through the optical line to the light-receiving element, where one of the light-receiving element and the light-emitting element is provided on one surface of the platform on an opposite side of the optical line with the optical filter interposed therebetween, and the other is provided on the other surface of the platform to correspond to the through-hole.

According to another aspect, there is provided an optical communication module including: a platform configured to have a plurality of through-holes each of which vertically passes through the platform and is provided in parallel with a direction of light input or output through an optical line; an optical receiver configured to be provided on the platform and include at least one light-receiving element; an optical transmitter configured to be provided on the platform and include at least one light-emitting element; and a plurality of optical filters configured to have different wavelength pass bands and to be provided on one surface of the platform to correspond to the through-holes, transmit light from the light-emitting element to an optical line, and transmit light input through the optical line to the light-receiving element, wherein one of the optical receiver and the optical transmitter is provided on one surface of the platform on an opposite side of the optical line with the optical filters interposed therebetween, and the other is provided on the other surface of the platform to correspond to the through-hole.

According to yet another aspect, there is provided an optical communication module including: a platform configured to have a plurality of through-holes each of which vertically passes through the platform and is provided in parallel with a direction of light input or output through an optical line; and a plurality of optical filters configured to have different wavelength pass bands and to be provided on one surface of the platform to correspond to the through-holes, wherein a plurality of light-receiving elements or light-emitting elements are provided on the other surface of the platform to correspond to the through-holes.

According to the present invention, the optical communication module may be configured such that one of the light-emitting element of the optical transmitter and the light-receiving element of the optical receiver is first provided in a passive alignment manner and the other is provided in an active alignment manner. Accordingly, it is possible to reduce the number of the process steps and to save the module process cost.

Furthermore, the optical transmitter and the optical receiver may be provided in an active alignment manner. In addition, if the platform has a through-hole with an inclined inner sidewall, it is possible to improve the optical coupling efficiency.

Further, since the optical receiver and the optical transmitter may be separately provided on both sides of the platform, it is possible to minimize optical or electrical crosstalk. Accordingly, it may be applied to high-speed signal transmission.

Furthermore, the present invention may be applied to an optical communication module which is configured in a triplexer form to make bidirectional communication or multiplexing communication.

Other features will become apparent to those skilled in the art from the following detailed description, which, taken in

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

For convenience of explanation, an exemplary optical communication module using a silicon wafer will be described. A platform using a silicon wafer may use a silicon optical bench (SiOB) by wet etching to mount an optical lens or an optical filter thereon. More specifically, an optical transmitter and an optical receiver are provided on both sides of the platform using the SiOB and an optical lens or an optical filter is provided on a groove formed on the platform. The groove of the platform in may be formed by wet etching.

The platform using the SiOB is provided at one side of an optical line and has a through-hole therein which vertically passes through the platform. The optical filter is provided on one surface of the platform to correspond to the through-hole. In case of a bidirectional optical communication module, light with a wavelength passes through the optical filter and light with another wavelength is reflected by the optical filter. An optical lens, a monitoring element, an optical isolator, a thermistor and thermoelectric cooler (TEC), an amplifier, and a passive element may be used, if necessary. The optical lens built in a package may be used, in which case the platform may become smaller.

Figure 1:
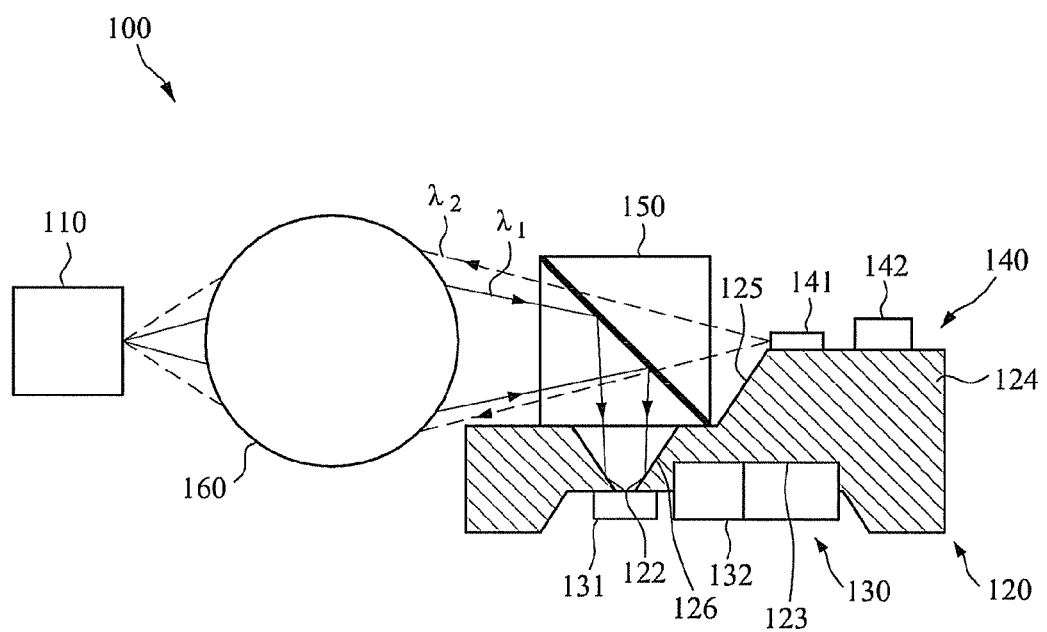
FIG. 1 is a cross-sectional view of an optical communication module according to a first embodiment of the present invention.

FIG. 1 is a cross-sectional view of an optical communication module according to a first embodiment of the present invention.

Referring to FIG. 1, an optical communication module 100 may transmit and receive light in both directions at the same time. The optical communication module 100 includes an optical line 110, a platform 120, an optical receiver 130, an optical transmitter 140, an optical filter 150 and an optical line focusing lens 160. The optical line focusing lens 160 may be mounted on a package rather than on the platform 120.

The optical line 110 may be an optical fiber or a stub for optical communication. The optical line 110 may receive light $\lambda_1$ from outside and transmit it to the optical receiver 130. Further, the optical line 110 may receive light $\lambda_2$ from the optical transmitter 140 and transmit it to the outside.

The platform 120 is provided at one side of the optical line 110. The platform 120 may partly have depressed and flat portions at its top and bottom surfaces which are formed by various methods such as wet etching. The platform 120 has a through-hole 122 which perpendicularly passes through the platform 120. The through-hole 122 may be formed by wet etching.

Manufacturing the platform 120 and the through-hole 122 by wet etching rather than by dry etching may facilitate the mass production process, thereby reducing the manufacturing cost. However, the platform 120 and the through-hole 122 may be formed by dry etching. Further, the through-hole 122 may be formed by different methods such as laser drilling.

The optical receiver 130 is mounted on the platform 120. The optical receiver 130 includes a light-receiving element 131. The light-receiving element 131 may be a photodiode. The light-receiving element 131 is mounted on a bottom surface of the platform 120 to correspond to the through-hole 122. An active area 131a (see FIG. 3) of the light-receiving element 131 is provided to correspond to the through-hole 122. The light-receiving element 131 may be mounted on the platform 120 by solder 101.

The optical receiver 130 may further include an amplifier 132 to convert current generated by the light-receiving element 131 into voltage and amplify the voltage and/or a passive element to reduce noise. In this case, the amplifier 132 may be partly or fully received in a groove 123 which is formed on a bottom surface of the platform 120 to make a thinner platform 120 and a shorter bonding wire for high-speed signal transmission. The optical receiver 130 may further include a passive element to reduce noise.

The optical transmitter 140 is mounted on the platform 120. The optical transmitter 140 includes a light-emitting element 141. The light-emitting element 141 may be a laser diode. The light-emitting element 141 is mounted on a top surface of the platform 120. The light-emitting element 141 is provided on the opposite side of the optical line 110 with the optical filter 150 interposed therebetween.

The light-emitting element 141 may be mounted on a protrusion 124 projected from the platform 120 to be optically coupled with the optical line 110. The protrusion 124 may be formed to have an inclined surface 125 which faces the optical filter 150 and is inclined toward the optical filter 150.

The protrusion 124 may not have the inclined surface 125 to reduce a distance between the light-emitting element 141 and the optical filter 150. The optical transmitter 140 may further include a monitoring element 142 to control light output from the light-emitting element 141. An optical isolator (not shown) may be provided between the light-emitting element 141 and the optical filter 150 to reduce noise caused by the relative intensity of noise of and reflection of the light-emitting element 141.

The optical transmitter 140 may further include at least one of a matching resistor for transmission matching, an inductor and/or capacitor for noise reduction, and a thermistor and/or thermoelectric cooler for temperature control. Further, a thin-film or chip type of passive element may be deposited or mounted on the platform 120.

The optical filter 150 is mounted on the platform 120 to correspond to the through-hole 122. The optical filter 150 is adapted to transmit or reflect incident light according to the wavelength of the light. More specifically, the optical filter 150 may transmit light $\lambda_2$ from the light-emitting element 141 to the optical line 110, and reflect light $\lambda_1$ input through the optical line 110 to the light-receiving element 131, thereby enabling simultaneous bidirectional communication.

The optical line focusing lens 160 is used to focus the light $\lambda_2$ passing through the optical filter 150 and transmit it to the optical line 110. The optical line focusing lens 160 is provided between the optical line 110 and the optical filter 150.

Although not shown, the light-emitting element may be provided on the bottom surface of the platform 120 to correspond to the through-hole 122 and the light-receiving element may be provided on the top surface of the protrusion 124. In this case, the light-receiving element may be an edge-illuminated photodiode.

The optical communication module 100 is configured such that the light-emitting element 141 of the optical transmitter 140 is provided in a passive alignment manner and the light-receiving element 131 of the optical receiver 130 is provided in an active alignment manner. Accordingly, it is possible to reduce the number of the process steps, save the process cost and improve the optical coupling efficiency. Further, since the optical receiver 130 and the optical transmitter 140 are separately provided on both sides of the platform 120, it is possible to minimize optical or electrical crosstalk. Accordingly, it may be applied to high-speed signal transmission.

Figure 2:
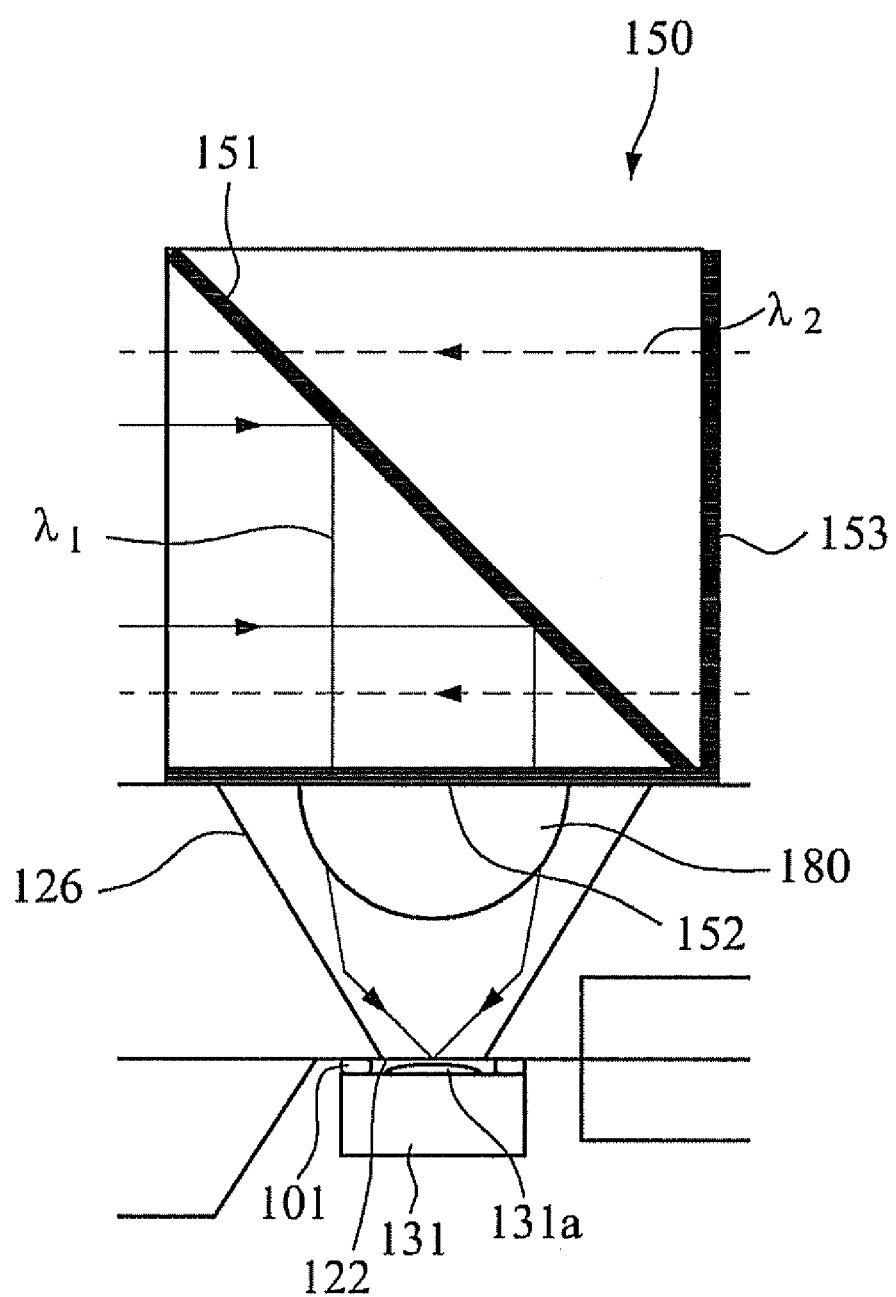
FIG. 2 is a cross-sectional view illustrating how a light-receiving element and an optical filter are optically coupled to a through-hole in FIG. 1.

As shown in FIG. 2, the inner wall of the through-hole 122 may be inclined. The inclined surface 126 may be enlarged in width upward of the through-hole 122. In this case, even though the beam size of light transmitted to the light-receiving element 131 is larger than an active area 131a of the light-receiving element 131, the light may be reflected on the inclined surface 126 and focused on the light-receiving element 131.

Accordingly, it is possible to maximize the optical coupling efficiency. More specifically, if the optical communication module 100 is made compact and thus becomes thinner in thickness, when the beam diameter may be larger than the active area 131a of the light-receiving element 131, the inclined surface may be used to improve the optical coupling efficiency. In this case, an increased alignment tolerance may facilitate its alignment. Furthermore, if the light-emitting element 141 is provided to correspond to the through-hole 122, the inclined surface 126 of the through-hole 122 may cause decreased numerical aperture.

Figure 3:
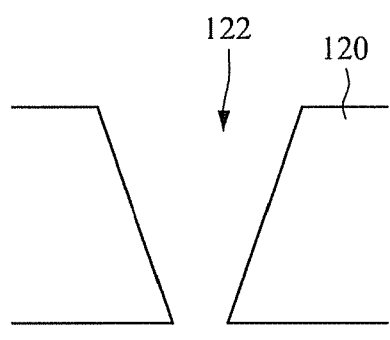
FIG. 3 is a cross-sectional view of other through-holes in FIG. 1.
Figure 3:
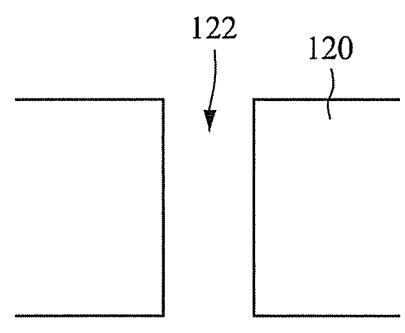
Figure 3:
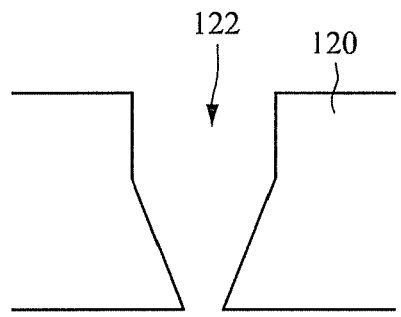
Figure 3:
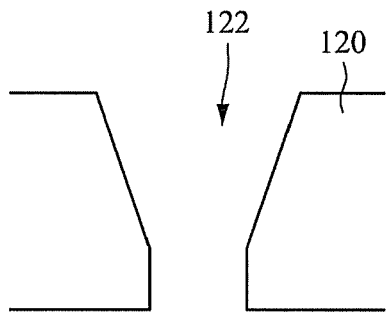

As shown in FIG. 3, the through-hole 122 may be shaped in other forms. More specifically, the through-hole 122 may have an inclined inner sidewall as shown in FIG. 3(a) or have a vertical inner sidewall as shown in FIG. 3(b). In addition, the through-hole 122 may have a vertical inner sidewall at its upper portion and an inclined inner sidewall at its lower portion as shown in FIG. 3(c) or have an inclined inner sidewall at its upper portion and a vertical inner sidewall at its lower portion as shown in FIG. 3(d).

Referring back to FIG. 2, the optical filter 150 may be a hexahedron and include a filtering surface 151 therein. The filtering surface 151 may be provided at an angle of 45 degrees with respect to both a light-receiving surface of the light-receiving element 131 and the direction of light emitted from the light-emitting element 141. The optical filter 150 may have a block filter 152 on its surface facing the light-receiving element 131. The block filter 152 is used to block a specific wavelength band to thereby reduce optical crosstalk.

The optical filter 150 may further include an anti-reflection (AR) coating 153 to minimize reflection on its surface facing the light-emitting element 141. In addition, an optical receiver focusing lens 180 may be included between the light-receiving element 131 and the optical filter 150. The optical receiver focusing lens 180 will be further described below.

Figure 4:
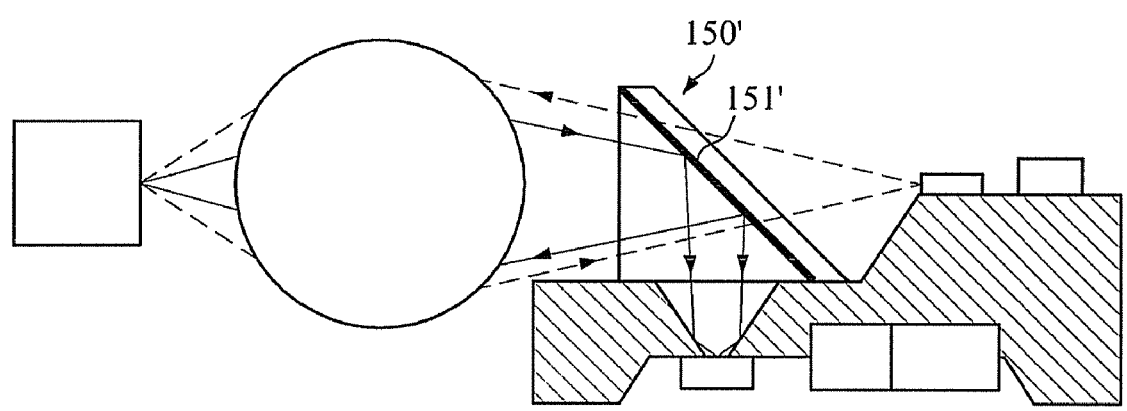
FIG. 4 is a cross-sectional view of another optical filter in FIG. 1.

As shown in FIG. 4, an optical filter 150' may be provided, but not limited to, by attaching a thin-film optical filter 151' in a hang-over form to a prism-like structure with a surface of an angle of 45 degrees.

Figure 5:
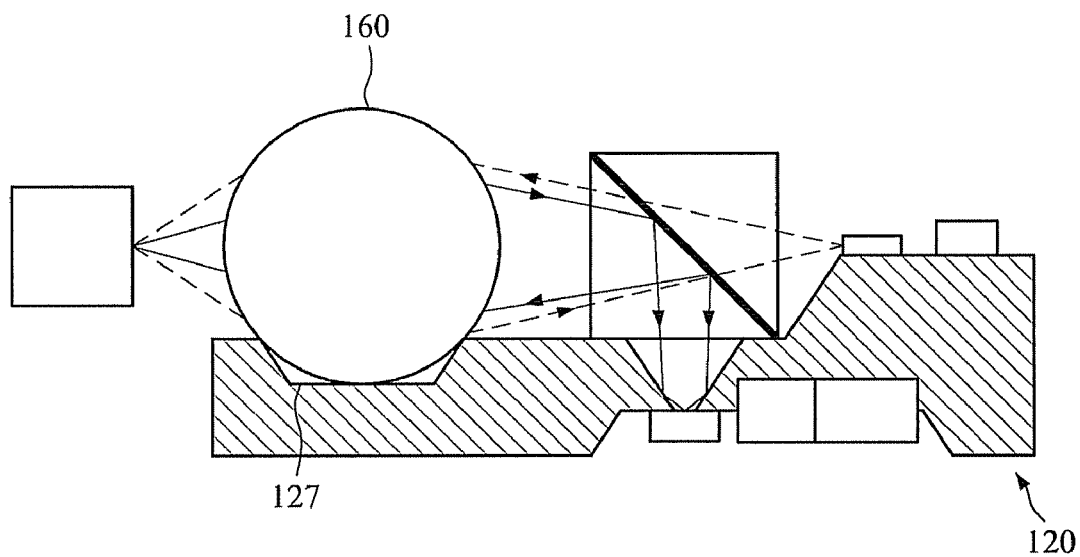
FIG. 5 is a cross-sectional view illustrating how an optical line focusing lens is placed on a groove in FIG. 1.

As shown in FIG. 5, the optical line focusing lens 160 may be provided on a groove 127 which is formed on the top surface of the platform 120. The groove 127 may be differently formed to reduce the alignment degree of freedom of the optical line focusing lens 160. For example, the groove 127 may be configured to have an inclined inner sidewall and a flat bottom surface, or may be shaped in a V-groove form.

Figure 6:
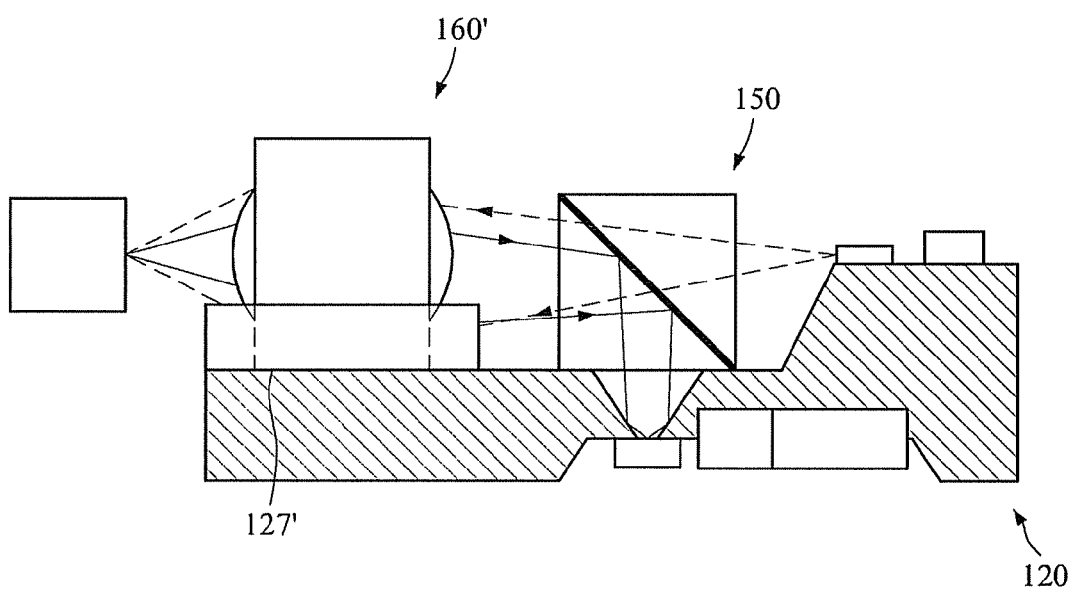
FIG. 6 is a cross-sectional view of another optical line focusing lens in FIG. 5.

Although the optical line focusing lens 160 may be a ball lens as shown in FIG. 1, an optical line focusing lens 160' may be an aspheric lens as shown in FIG. 6, a half-ball lens or the like. The optical line focusing lens 160' may be placed on a groove 127' which is formed on the top surface of the platform 120.

Figure 7:
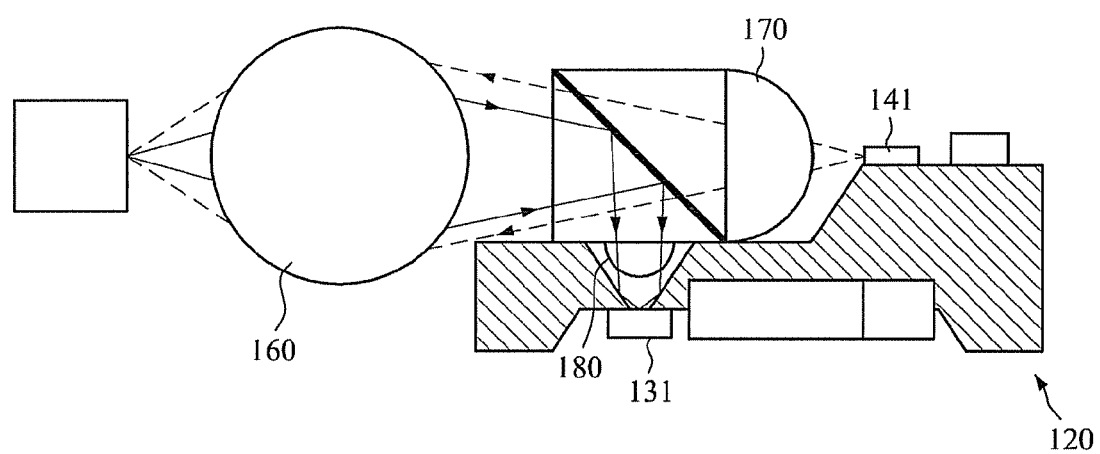
FIG. 7 is a cross-sectional view of an optical communication module further including an optical receiver focusing lens and a collimating lens in FIG. 1.

As shown in FIG. 7, a collimating lens 170 may be further provided between the light-emitting element 141 and the optical filter 150, and the optical receiver focusing lens 180 may be further provided between the light-receiving element 131 and the optical filter 150. The collimating lens 170 is used to collimate light $\lambda_2$ from the light-emitting element 141 and transmit it to the optical filter 150. As described above, the optical receiver focusing lens 180 focuses light $\lambda_1$ reflected by the optical filter 150 and transmits it to the light-receiving element 131.

The collimating lens 170 may be a half-ball lens, in which case its flat surface may be attached to the optical filter 150. The optical receiver focusing lens 180 may be a ball lens or a half-ball lens, in which case the optical receiver focusing lens 180 may be built in the through-hole 122, under the optical filter 150. In case of a half-ball lens, it is desirable that the optical receiver focusing lens 180 may be attached to the optical filter 150 and be built, together with the optical filter 150, in the platform 120.

Figure 8:
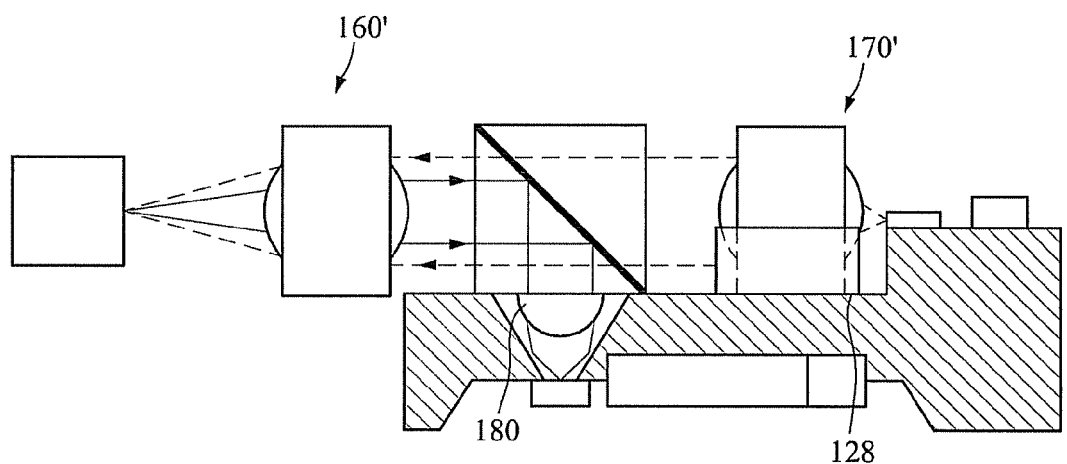
FIG. 8 is a cross-sectional view illustrating how a collimating lens is placed on a groove in FIG. 7.
Figure 9:
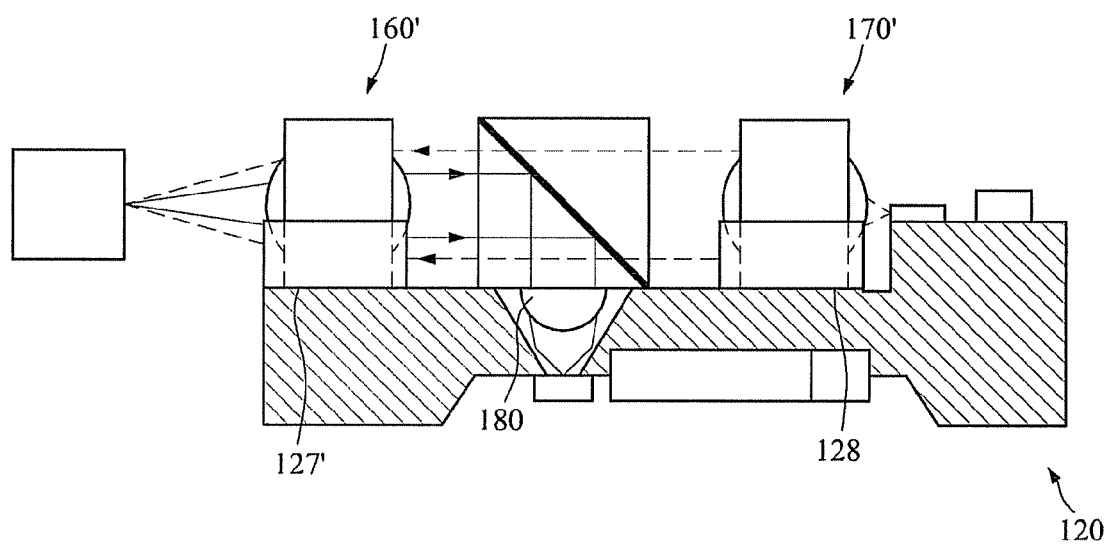
FIG. 9 is a cross-sectional view illustrating how an optical line focusing lens is placed on a groove in FIG. 8.

As shown in FIG. 8, a collimating lens 170' may be an aspheric lens. The collimating lens 170' may be placed on a groove 128 which is formed on the top surface of the platform 120. As shown in FIG. 9, the collimating lens 170' may be placed on the groove 128, while the aspheric optical line focusing lens 160' may be placed on the groove 127' of the platform 120.

Figure 10:
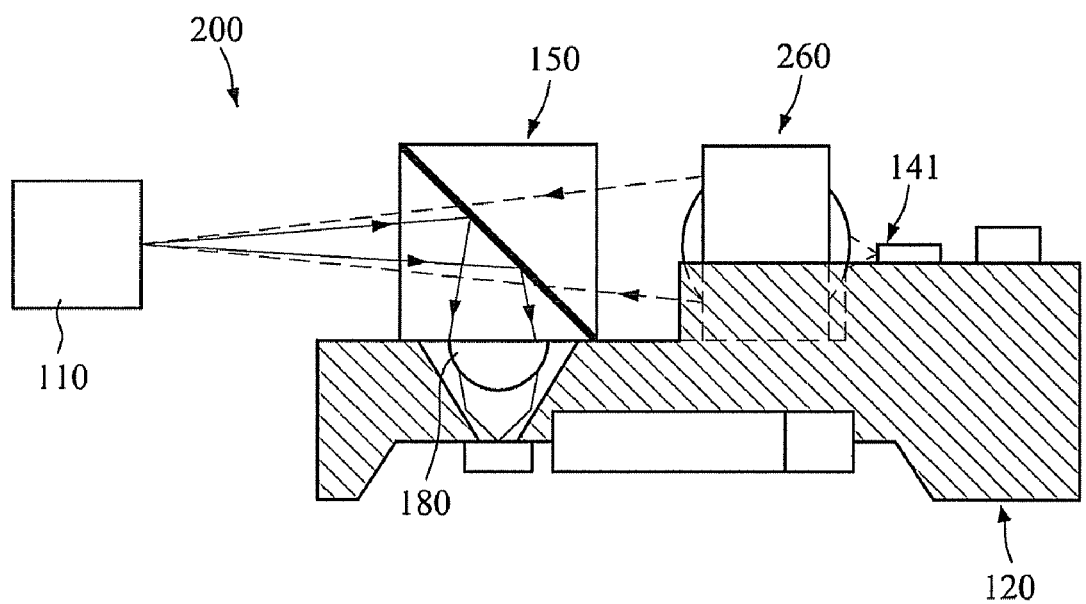
FIG. 10 is a cross-sectional view of an optical communication module according to a second embodiment of the present invention.

FIG. 10 is a cross-sectional view of an optical communication module according to a second embodiment of the present invention. Like reference numerals denote like elements and a detailed description thereof will thus be omitted herein.

Referring to FIG. 10, an optical communication module 200 is configured such that an optical line focusing lens 260 is provided between the light-emitting element 141 and the optical filter 150. The optical line focusing lens 260 focuses light from the light-emitting element 141 and transmits it to the optical line 110 through the optical filter 150. The optical line focusing lens 260 may be an aspheric lens as shown in FIG. 10. However, the optical line focusing lens 260 may be a ball lens or a half-ball lens and may be placed on a groove which is formed on the platform 120 as described above.

The optical filter 150 may be implemented in such ways as described above. For another example, the light-emitting element 141 may be provided on the bottom surface of the platform 120 to correspond to the through-hole 122. From the optical communication module 200 thus configured, the same effect as described in the first embodiment may be obtained.

Figure 11:
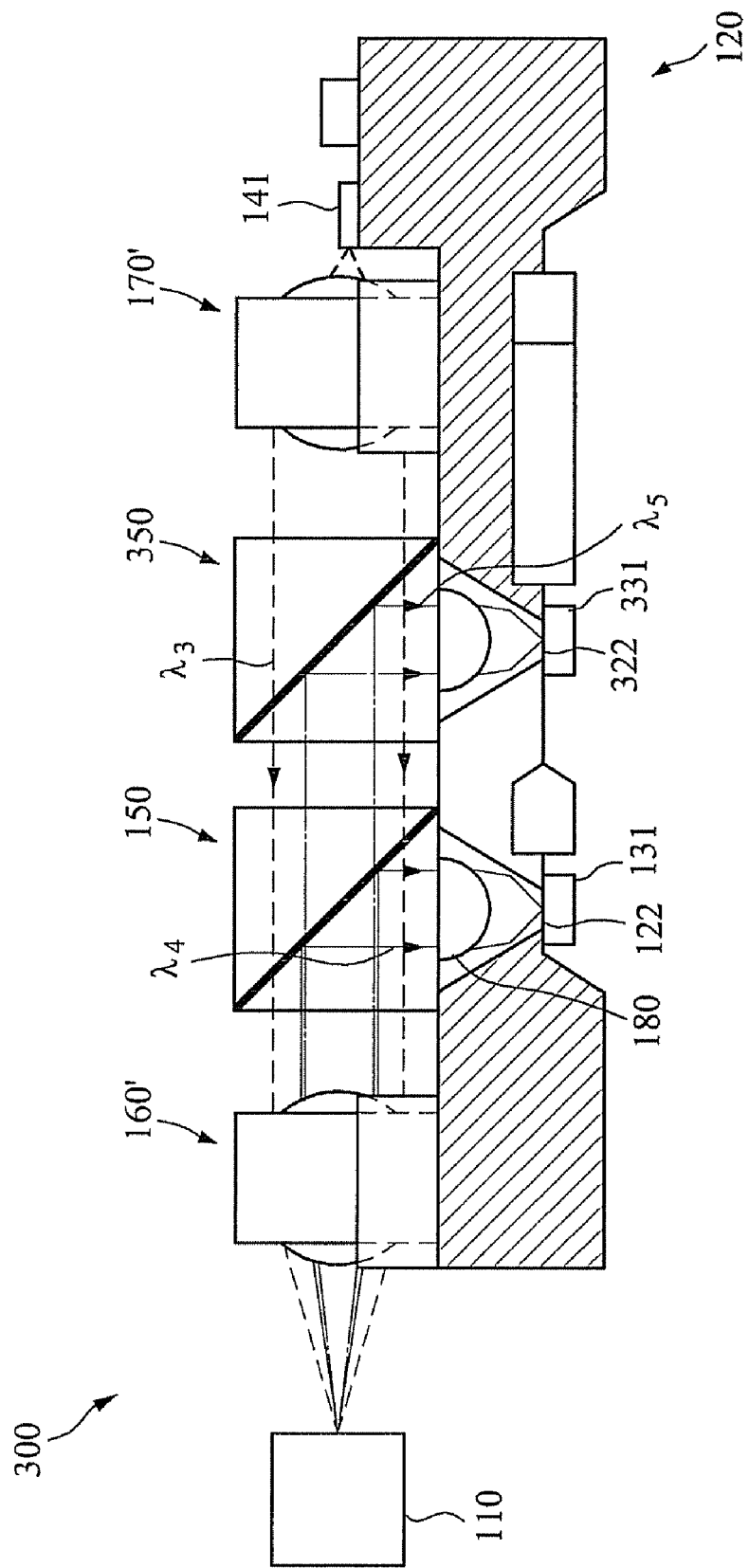
FIG. 11 is a cross-sectional view of an optical communication module according to a third embodiment of the present invention.

FIG. 11 is a cross-sectional view of an optical communication module according to a third embodiment of the present invention.

Referring to FIG. 11, an optical communication module 300 is configured in a triplexer form to make bidirectional communication with a single optical line 110.

The optical communication module 300 includes at least one additional through-hole 322 and one additional optical filter 350. Like the through-hole 122, the additional through-hole 322 is formed to vertically pass through the platform 120. The additional through-hole 322 is arranged next to the through-hole 122 in parallel with the direction of light input and output through the optical line 110. The additional through-hole 322 may have the same configuration as the through-hole 122.

The additional optical filter 350 is provided on the platform 120 to correspond to the additional through-hole 322. The additional optical filter 350 has a different wavelength pass band than the optical filter 150 which is provided on the through-hole 122. This is for filtering three different optical wavelengths.

For example, it is assumed that the optical communication module 300 includes one optical transmitter and two optical receivers. In this case, the light-receiving element 131 and the additional light-receiving element 331 are provided on the bottom surface of the platform 120 to correspond to the through-hole 122 and the additional through-hole 322, and the light-emitting element 141 is provided on the top surface of the platform 120.

Light $\lambda_3$ from the light-emitting element 141 passes through the optical filter 150 and the additional optical filter 350 and is transmitted to the optical line 110. One $\lambda_4$ of two lights input from the optical line 110 may be reflected by the optical filter 150 and transmitted to the light-receiving element 131, and the other light $\lambda_5$ may pass through the optical filter 150 and be reflected by the additional optical filter 350 to the additional light-receiving element 351.

For another example, although not shown, the optical communication module 300 may include two optical transmitters and one optical receiver. In this case, the light-emitting element and the additional light-emitting element are provided on the bottom surface of the platform 120 to correspond to the through-hole 122 and the additional through-hole 322, and the light-receiving element is provided on the top surface of the platform 120.

From the optical communication module 300 thus configured, bidirectional communication is made possible in a triplexer form and the same effect as described in the first embodiment may be obtained. If a plurality of additional through-holes 322 and additional optical filters 350 corresponding to the additional through-holes 322 are provided, bidirectional communication is made possible in a multiplex form. Accordingly, the present invention is not limited to the example described above.

Figure 12:
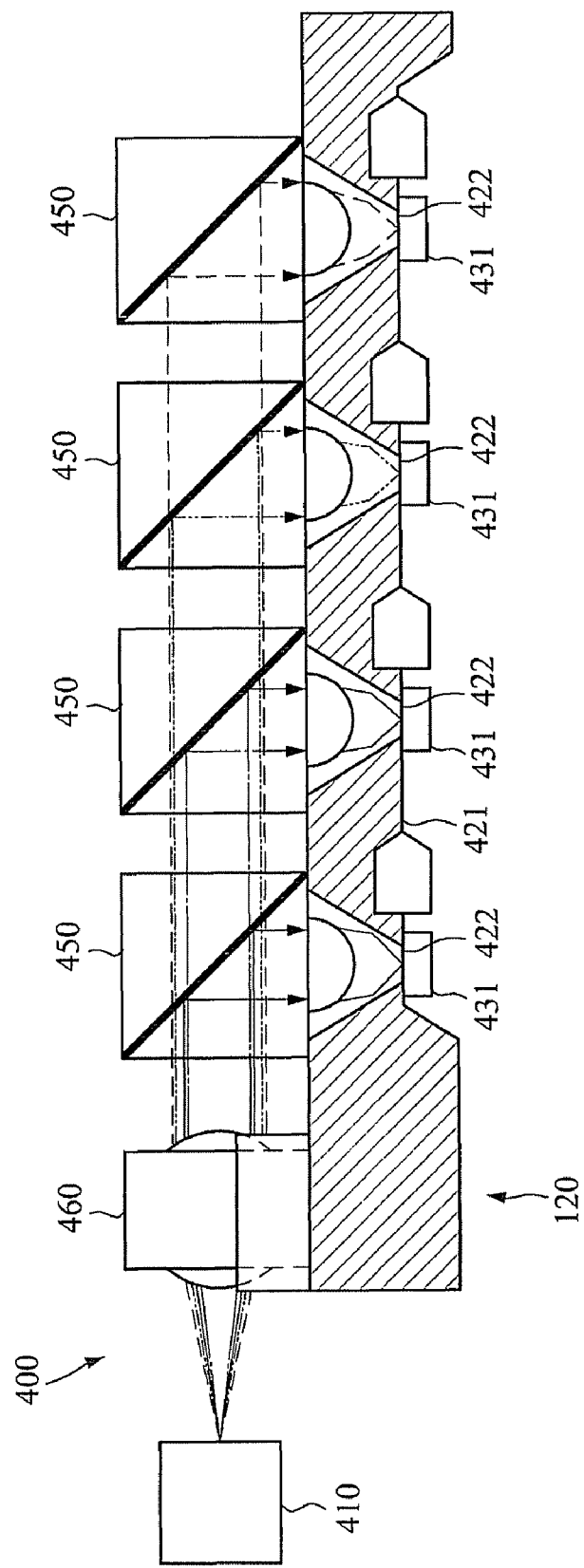
FIG. 12 is a cross-sectional view of an optical communication module according to a fourth embodiment of the present invention.

FIG. 12 is a cross-sectional view of an optical communication module according to a fourth embodiment of the present invention. Referring to FIG. 12, an optical communication module 400 enables multiplexing communication with a signal optical line 410 by multiplexing multi-wavelength light depending on wavelengths.

The optical communication module 400 includes an optical line 410, a platform 120, a plurality of optical filters 450 and a lens 460. The optical line 410 may be an optical fiber or a stub.

The platform 120 includes a plurality of through-holes 422. Each of the through-holes 422 is formed to vertically pass through the platform 120. The though-holes 422 are arranged in parallel with the direction of light input or output through the optical line 410. Four through-holes 422 are shown in FIG. 12, but any number of through-holes 422 may be used.

Each through-hole 422 may have an inclined inner sidewall 426 which is enlarged in width upwards. The effect is the same as described in the optical communication module according to the first embodiment of the invention. The platform 120 and the through-hole 422 may be foamed in the same manner as in the first embodiment of the invention.

Light-receiving elements 431 are provided on the bottom surface of the platform 120 to correspond to the through-holes 422. For another example, the light-emitting elements may be provided on the bottom surface of the platform 120 to correspond to the through-holes 422.

Each optical filter 450 is provided on the top surface of the platform 120 to correspond to each through-hole 422. Each optical filter 450 has a different wavelength pass band. Accordingly, if the light-receiving elements 431 are provided below the through-holes 422, the optical filters 450 may filter multi-wavelength light input through the optical line 410 depending on the wavelengths and transmit them to the light-receiving elements 431. If the light-emitting elements are provided below the through-holes 422, the optical filters 450 may multiplex multi-wavelength light output from the light-emitting elements depending on the wavelengths and transmit them to the optical line 410.

The lens 460 is provided between the optical line 410 and one of the optical filters which is closest to the optical line 410. If the light-receiving elements 431 are provided below the through-holes 422, the lens 460 may be a collimating lens which collimates light input through the optical line 410 and transmits it to the optical filter 450. If the light-emitting elements are provided below the through-holes 422, the lens 460 may be a focusing lens which focuses light output through the optical filters 450 and transmits it to the optical line 410.

As described above, the optical communication module 400 may use a single optical line 410 to enable multiplexing communication and allow the light-receiving elements or light-emitting elements to be provided on the through-holes 422 in an active alignment manner. Accordingly, it is possible to improve the optical coupling efficiency and facilitate the optical coupling.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical communication module comprising:
a platform configured to have a through-hole therein which vertically passes through the platform;
an optical receiver configured to be provided on the platform and include a light-receiving element and an amplifier for converting current generated by the light-receiving element into voltage and then amplifying the voltage;
an optical transmitter configured to be provided on the platform and include a light-emitting element; and
an optical filter configured to be provided on one surface of the platform to correspond to the through-hole, transmit light from the light-emitting element to an optical line, and transmit light input through the optical line to the light-receiving element,
an optical line focusing lens configured to be provided between the optical line and the optical filter; and
an optical receiver focusing lens configured to be provided between the light-receiving element and the optical filter,
wherein one of the light-receiving element and the light-emitting element is provided on one surface of the platform on an opposite side of the optical line with the optical filter interposed therebetween, and the other is provided on the other surface of the platform to correspond to the through-hole and
a first groove on which the optical line focusing lens is placed is formed on one surface of the platform, and a second groove for receiving the amplifier together with the light-receiving element or the light-emitting element is formed on the other surface of the platform.

2. The optical communication module of claim 1, wherein the through-hole has an inclined inner sidewall which becomes wider toward the optical filter.

3. The optical communication module of claim 1, wherein the optical filter comprises a filtering surface which is provided at an angle of 45 degrees with respect to both a light-receiving surface of the light-receiving element and a direction of light emitted from the light-emitting element.

4. The optical communication module of claim 1, wherein a protrusion is provided on the platform to be protruded from a surface of the platform on which the optical filter is mounted, and one of the light-receiving element and the light-emitting element is mounted on the protrusion.

5. The optical communication module of claim 1, further comprising
a collimating lens which is provided between the light-emitting element and the optical filter to collimate light from the light-emitting element and transmit the collimated light to the optical line focusing lens through the optical filter.

6. The optical communication module of claim 1, further comprising at least one of:
an optical line focusing lens which is provided between the light-emitting element and the optical filter to focus light from the light-emitting element and transmit the focused light to the optical line through the optical filter; and
an optical receiver focusing lens between the light-receiving element and the optical filter.

7. The optical communication module of claim 1, wherein the optical transmitter further comprises at least one of an optical isolator to reduce noise caused by a relative intensity of noise of and reflection of the light-emitting element, a monitoring element for output light control, a matching resistor for transmission matching, an inductor and/or capacitor for noise reduction, and a thermistor and/or thermoelectric cooler for temperature control.

8. An optical communication module comprising:
a platform configured to have a plurality of through-holes each of which vertically passes through the platform and is provided in parallel with a direction of light input or output through an optical line;
an optical receiver configured to be provided on the platform and include at least one light-receiving element and an amplifier for converting current generated by the light-receiving element into voltage and then amplifying the voltage;
an optical transmitter configured to be provided on the platform and include at least one light-emitting element;
a plurality of optical filters configured to have different wavelength pass bands and to be provided on one surface of the platform to correspond to the through-holes, transmit light from the light-emitting element to an optical line, and transmit light input through the optical line to the light-receiving element;
an optical line focusing lens which focuses light passing through the optical filters and transmits the focused light to the optical line; and
an optical receiver focusing lens configured to be provided between the light-receiving element and the optical filter,
wherein one of the optical receiver and the optical transmitter is provided on one surface of the platform on an opposite side of the optical line with the optical filters interposed therebetween, and the other is provided on the other surface of the platform to correspond to the through-hole, and
a first groove on which the optical line focusing lens is placed is formed on one surface of the platform, and a second groove for receiving the amplifier together with the light-receiving element or the light-emitting element is formed on the other surface of the platform.

9. The optical communication module of claim 8, wherein the through-hole has an inclined inner sidewall which becomes wider toward the optical filter.

10. The optical communication module of claim 8, wherein each of the optical filters comprises a filtering surface which is provided at an angle of 45 degrees with respect to both a light-receiving surface of the light-receiving element and a direction of light emitted from the light-emitting element.

11. The optical communication module of claim 8, further comprising:
a collimating lens which is provided between the light-emitting element and the optical filter to collimate light from the light-emitting element and transmit the collimated light to the optical line focusing lens through the optical filter.

12. The optical communication module of claim 8, wherein the optical transmitter further comprises at least one of an optical isolator to reduce noise caused by a relative intensity of noise of and reflection of the light-emitting element, a monitoring element for output light control, a matching resistor for transmission matching, an inductor and/or capacitor for noise reduction, and a thermistor and/or thermoelectric cooler for temperature control.

13. An optical communication module comprising:
a platform configured to have a plurality of through-holes each of which vertically passes through the platform and is provided in parallel with a direction of light input or output through an optical line; and a plurality of optical filters configured to have different wavelength pass bands and to be provided on one surface of the platform to correspond to the through-holes; and a lens configured to be provided between the optical line and an optical filter closet to the optical line among the optical filters, wherein a plurality of light-receiving elements or light-emitting elements are provided on the other surface of the platform to correspond to the through-holes, at least one of the optical filters includes a block filter configured to block specific wavelength band to thereby reduce optical crosstalk, and a first groove on which the lens is placed is formed on one surface of the platform, and a second groove for receiving the light-receiving element or the light-emitting element is formed on the other surface of the platform.

14. The optical communication module of claim 13, wherein each of the through-holes has an inclined inner sidewall which becomes wider toward the optical filter.

15. The optical communication module of claim 13, wherein each of the optical filters comprises a filtering surface which is provided at an angle of 45 degrees with respect to both a light-receiving surface of the light-receiving element and a direction of light emitted from the light-emitting element.

16. The optical communication module of claim 13, further comprising
a plurality of lenses configured to be provided below the optical filters and to focus light reflected by the optical filters, respectively, to the light-receiving elements or to collimate light from the light-emitting elements and transmit the collimated light to the optical filter, respectively.

17. The optical communication module of claim 13, further comprises an amplifier to convert current generated by the light-receiving element into voltage and amplify the voltage and/or a passive element to reduce noise.

18. The optical communication module of claim 13, further comprises at least one of an optical isolator to reduce noise caused by a relative intensity of noise of and reflection of the light-emitting element, a monitoring element for output light control, a matching resistor for transmission matching, an inductor and/or capacitor for noise reduction, and a thermistor and/or thermoelectric cooler for temperature control.

19. An optical communication module comprising:
a platform configured to have a through-hole therein which vertically passes through the platform;

an optical receiver configured to include a light-receiving element provided on the bottom surface of the platform to correspond to the through-hole and an amplifier for converting current generated by the light-receiving element into voltage and then amplifying the voltage;

an optical transmitter configured to include a light-emitting element provided on the top surface of the platform;

an optical filter configured to be provided on the top surface of the platform to correspond to the through-hole, to transfer output light from the light-emitting element to the optical line, and to transfer input light received via the optical line to the light-receiving element;

an optical line focusing lens configured to be provided between the light-emitting element and the optical filter;

an optical isolator configured to be provided between the light-emitting element and the optical filter; and an optical receiver focusing lens configured to be provided between the light-receiving element and the optical filter, where a first groove on which the optical line focusing lens or the optical isolator is placed is formed on the top surface of the platform, and a second groove for receiving the light-receiving element and the amplifier is formed on the bottom surface of the platform.

* * * * *